United States Patent

Westeppe et al.

[11] Patent Number: 5,132,154
[45] Date of Patent: * Jul. 21, 1992

[54] POLYCARBONATE MIXTURES IN OPTICAL APPLICATIONS

[75] Inventors: Uwe Westeppe, Mettmann; Gunther Weymans, Leverkusen; Dieter Freitag; Karsten-Josef Idel, both of Krefeld, all of Fed. Rep. of Germany

[73] Assignee: Bayer Aktiengesellschaft, Leverkusen, Fed. Rep. of Germany

[*] Notice: The portion of the term of this patent subsequent to Apr. 14, 2009 has been disclaimed.

[21] Appl. No.: 531,230

[22] Filed: May 31, 1990

[30] Foreign Application Priority Data

Jun. 6, 1989 [DE] Fed. Rep. of Germany ....... 3918406

[51] Int. Cl.$^5$ ................. C08L 69/00; G02B 1/04; G11B 5/62
[52] U.S. Cl. ......................... 428/65; 428/64; 428/412; 525/462; 525/469
[58] Field of Search ............... 528/204; 525/462, 469; 428/64, 65, 412

[56] References Cited

U.S. PATENT DOCUMENTS

| 4,680,374 | 7/1987 | Hasuo | 428/412 |
| 4,982,014 | 1/1991 | Freitag | 528/196 |

FOREIGN PATENT DOCUMENTS

| 3704688 | 8/1988 | Fed. Rep. of Germany . | |
| 3833953 | 4/1990 | Fed. Rep. of Germany . | |
| 010160 | 1/1987 | Japan | 525/462 |
| 043557 | 2/1989 | Japan | 525/462 |
| 043558 | 2/1989 | Japan | 525/462 |
| 043559 | 2/1989 | Japan | 525/462 |

Primary Examiner—James J. Seidleck
Assistant Examiner—David Buttner
Attorney, Agent, or Firm—Joseph C. Gil; Richard E. L. Henderson

[57] ABSTRACT

An article for an optical application is disclosed comprising
a) about 0.1 to 99.9 wt. % of a thermoplastic, aromatic polycarbonate resin containing carbonate structural units corresponding to (Ia):

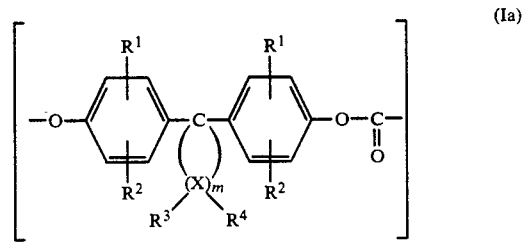

wherein
$R^1$ and $R^2$ independently represent hydrogen, halogen, $C_1$-$C_8$ alkyl, $C_5$-$C_6$ cycloalkyl, $C_6$-$C_{10}$ aryl or $C_7$-$C_{12}$ aralkyl; m represents an integer of from 4 to 7;
$R^3$ and $R^4$, which are selected individually for each X, independently represent hydrogen or $C_1$-$C_6$ alkyl; and
X represents a carbon atom;
provided that $R^3$ and $R^4$ both represent alkyl on at least one X atom; and
b) from 99.9 to 0.1 wt. % of at least one thermoplastic polycarbonate other than component (a).

9 Claims, No Drawings

POLYCARBONATE MIXTURES IN OPTICAL APPLICATIONS

German Patent Application P 38 33 953.6 (Le A 26 397) relates to mixtures of a) certain novel polycarbonates with b) elastomers or with thermoplastics other than the particular novel polycarbonates of component a) and optionally c) conventional additives, and to processes for the preparation of these mixtures.

Details of the German Patent Application P 38 33 953.6 may be seen in the text which follows on pages 2 to 52 of the present application:

German Patent Application P 38 93 953.6 relates to mixtures containing:

a) thermoplastic polycarbonates based on diphenols corresponding to the following general formula (I):

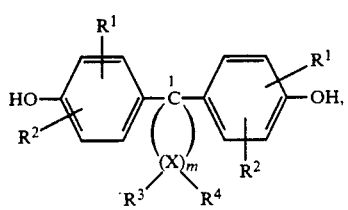

wherein
R$^1$ and R$^2$ independently represent hydrogen, halogen, C$_1$-C$_8$ alkyl, C$_5$ or C$_6$ cycloalkyl, C$_6$-C$_{10}$ aryl or C$_7$-C$_{12}$ aralkyl;
m represents an integer of from 4 to 7;
R$^3$ and R$^4$, which may be selected individually for each X, independently represent hydrogen or C$_1$-C$_6$ alkyl; and X represents carbon;
provided that R$^3$ and R$^4$ both represent alkyl on at least one X atom; and b) elastomers or thermoplastics other than those of component a); and, optionally,
c) conventional additives, and to processes for their preparation.

German Patent Application P 38 32 396.6 (Le A 26 344) describes polycarbonates (a) of the mixtures according to the invention and their starting materials and their preparation.

Starting materials for polycarbonates (a) are dihydroxydiphenylcyclohexanes (I):

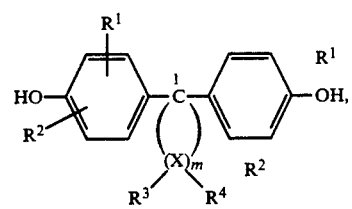

wherein
R$^1$ and R$^2$ independently represent hydrogen, halogen, preferably chlorine or bromine, C$_1$-C$_8$ alkyl, C$_5$ or C$_6$ cycloalkyl, C$_6$-C$_{10}$ aryl, preferably phenyl, and C$_7$-C$_{12}$ aralkyl, preferably phenyl-C$_1$-C$_4$ alkyl, in particular benzyl;
m represents an integer of from 4 to 7, preferably 4 or 5;
R$^3$ and R$^4$, which may be selected individually for each X, independently represent hydrogen or C$_1$-C$_6$ alkyl; and
X represents carbon;
provided that R$^3$ and R$^4$ both represent alkyl on at least one X atom.

R$^3$ and R$^4$ preferably both represent alkyl on 1 or 2 X atoms, in particular only at one X atom. Methyl is the preferred alkyl radical; the X atoms in the α-position to the diphenyl-substituted carbon atom (C-1) are preferably not dialkyl-substituted, on the other hand alkyl disubstitution in the β-position to C-1 is preferred.

Dihydroxydiphenylcyclohexanes having 5 or 6 ring carbon atoms in the cycloaliphatic radical (m represents 4 or 5 in general formula (I)), for example the diphenols:

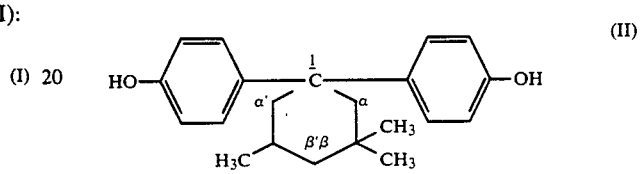

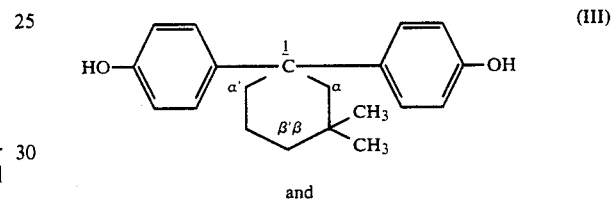

and

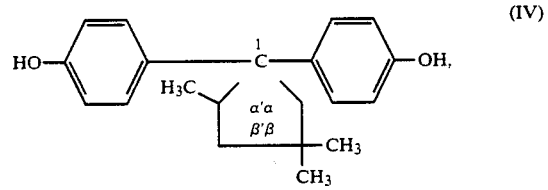

are preferred, 1,1-bis-(4-hydroxyphenyl)-3,3,5-trimethylcyclohexane (II) being particularly preferred.

Dihydroxydiphenylcycloalkanes (I) may be prepared in a known manner by condensing phenols (V):

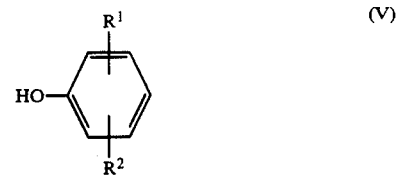

and ketones (VI):

wherein, X, R$^1$, R$^2$, R$^3$, R$^4$ and m are as defined in connection with general formula (I).

Phenols (V) are either known in the literature or may be obtained by processes known in the literature (see, for examples, under Cresols and Xylenols, Ullmanns Encyklopädie der technischen Chemie, 4th revised and extended edition, volume 15, pages 61–77, Verlag Chemie-Weinheim-New York 1978; under Chlorophenols, Ullmanns Encyklopädie der technischen Chemie, 4th edition, Verlag Chemie, 1975, volume 9, pages 573–582; and under Alkylphenols; Ullmanns Encyklopädie der technischen Chemie, 4th edition, Verlag Chemie 1979, volume 18, pages 191–214).

Examples of suitable phenols (V) are: phenol, o-cresol, m-cresol, 2,6-dimethylphenol, 2-chlorophenol, 3-chlorophenol, 2,6-dichlorophenol, 2-cyclohexylphenol, phenylphenols, and o-benzylphenol. Ketones (VI) are known in the literature (see for example Beilsteins Handbuch der Organischen Chemie, 7th volume, 4th edition, Springer-Verlag, Berlin, 1925 and the corresponding supplementary volumes 1 to 4, and J.Am.-Chem.Soc. Volume 79 (1957), pages 1488–1492, U.S. Pat. No. 2,692,289, Allen et al., J.Chem. Soc., (1959), 2186–2192 and J.Org.Chem. volume 38, (1973), pages 4431–4435, J.Am.Chem.Soc. 87, (1965), page 1353–1364). A general process for preparing ketones (VI) is described, for example, in Organikum, 15th edition, 1977, VEB-Deutscher Verlag der Wissenschaften, Berlin, for example page 698.

Examples of known ketones (VI) are: 3,3-dimethylcyclopentanone, 3,3-dimethylcyclohexanone, 4,4-dimethylcyclohexanone, 3-ethyl-3-methylcyclopentanone, 2,3,3-trimethylcyclopentanone, 3,3,4-trimethylcyclopentanone, 3,3-dimethylcycloheptanone, 4,4-dimethylcycloheptanone, 3-ethyl-3-methylcyclohexanone, 4-ethyl-4-methylcyclohexanone, 2,3,3-trimethylcyclohexanone, 2,4,4-trimethylcyclohexanone, 3,3,4trimethylcyclohexanone, 3,3,5-trimethylcyclohexanone, 3,4,4 - trimethylcyclohexanone, 3,3,5-trimethylcycloheptanone, 3,5,5-trimethylcycloheptanone, 5-ethyl-2,5-dimethylcycloheptanone, 2,3,3,5-tetramethylcyclopeptanone, 3,3,5,5-tetramethylcycloheptanone, 4-ethyl-2,3,4-trimethylcyclopentanone, 3-ethyl-4-isopropyl-3-methylcyclopentanone, 4-sec:butyl-3,3-dimethylcyclopentanone, 2-isopropyl-3,3,4-trimethylcyclopentanone, 3,-ethyl-4-isopropyl-3-methylcyclohexanon, 4,-ethyl-3-isopropyl-4-methylcyclohexanone, 3-sec:butyl-4,4-dimethylcyclohexanone, 2-butyl-3,3,4-trimethylcyclopentanone, 2-butyl-3,3,4-trimethylcyclohexanone, 4-butyl-3,3,5-trimethylcyclohexanone, 3-isohexyl-3-methylcyclohexanone, 2,2-dimethylcyclooctanone, and 3,3,8-trimethylcyclooctanone.

Examples of preferred ketones are:

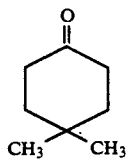

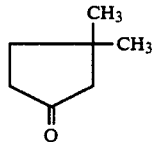

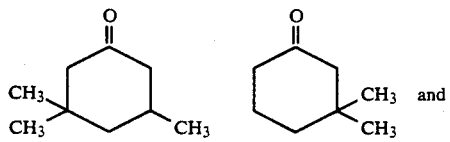 and

-continued

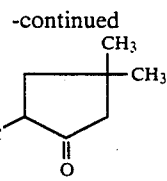

To prepare the bisphenol, in general from 2 to 10 moles, preferably from 2.5 to 6 moles, of phenol (V) per mole of ketone (VI) are used. Preferred reaction times are from 1 to 100 hours. In general, the reaction is carried out at temperatures of from 31 30° to +300° C., preferably from −15° to +150° C., and at pressures of from 1 to 20 bar, preferably from 1 to 10 bar.

In general, reaction is carried out in the presence of acid catalysts. Examples are hydrogen chloride, hydrogen bromide, hydrogen fluoride, boron trifluoride, aluminium trichloride, zinc dichloride, titanium tetrachloride, tin tetrachloride, phophorus halides, phophorus pentoxide, phosphoric acid, concentrated hydrochloric acid or sulphuric acid, and mixtures of acetic acid and acetic anhydride. The use of acid ion exchangers is also possible.

Furthermore, the reaction may be accelerated by adding co-catalysts, such as $C_1$–$C_{18}$ alkyl mercaptans, hydrogen sulphide, thiophenols, rhioacids and dialkylsulphides, preferably in amounts of from 0.01 to 0.4 mole/mole of ketone, more preferably from 0.05 to 0.2 mole/mole of ketone.

Condensation may be carried out without solvent or in the presence of an inert solvent (for example aliphatic and aromatic hydrocarbons or chlorohydrocarbons).

In cases where the catalyst simultaneously functions as a water-removing agent, it is not necessary to add additional water-removing agents, however, the latter is advantageous to obtain good conversions in each case when the catalyst used does not bond with the water resulting from the reaction.

Suitable water-removing agents are, for example acetic anhydride, zeolites, polyphosphoric acid and phosphorus pentoxide.

Phenol (V) and ketone (VI) may be reacted in the molar ratio (V) : (VI) of from 2:1, to 10:1, preferably from 2.5:1 to 6:1, at temperatures of from −30° to +300° C., preferably from −15° to +150° C., and at pressures of from 1 to 20 bar, preferably from 1 to 10 bar, in the presence of acid catalysts and optionally in the presence of co-catalysts and/or solvents and/or water-removing agents.

In general formula (I), $R^3$ and $R^4$ preferably both represent alkyl at 1 or 2 X atoms, in particular only on one X atom. Methyl is the preferred alkyl radical: ethyl or $C_3$–$C_6$ alkyl radicals which may be straight- or branched-chain may also be used. The X atoms in the α-position to the diphenyl-substituted carbon atom (C-1) are preferably not dialkyl-substituted, on the other hand disubstitution with alkyl in the β-position to C-1 is preferred.

In some cases, the reaction does not proceed uniformly, that is several different products may result, so that the desired compound has to be removed initially from the mixture. Reference should be made to Schnell, Chemistry and Physics of Polycarbonates, Interscience Publishers, New York 1964, for details of Condensation. Sometimes the reaction may be controlled by selecting appropriate catalysts and reaction conditions, so that the desired compound is precipitated or crystallised out, and this facilitates removal. The following instruction illustrate the preparation of diphenols (II).

EXAMPLE A 7.5 moles (705 g) of phenol and 0.15 mole (30.3 g) of dodecylthiol are placed in a 1 liter round flask with stirrer, dropping funnel, thermometer, reflux condenser and gas inlet pipe, and the mixture is saturated with dry HCl gas at from 28° to 30° C. A solution of 1.5 moles (210 g) of dihydroisophorone (3,3,5-trimethylcyclohexane-1-one) and 1.5 moles (151 g) of phenol are added dropwise to this solution over the course of 3 hours, while HCl gas is also fed through the reaction solution. When the reaction is complete, HCl gas is introduced for a further 5 hours. The reaction continues at room temperature for 8 hours. The excess phenol is then removed by steam distillation. The remaining residue is twice extracted while hot using petroleum ether (60–90) and once using methylene chloride and removed by filtration.

Yield: 370 g.

Melting point: 205° to 207° C. p Polycarbonates (a) may be prepared in accordance with German Patent Application P 38 32 396.6 from diphenols (I).

Both a diphenol (I), with formation of homopolycarbonates, and several diphenols (I), with formation of copolycarbonates, may be used.

In addition, diphenols (I) may also be used as a mixture with other diphenols, for example with those of the formula HO—Z—OH (VII) to prepare high molecular weight, thermoplastic, aromatic polycarbonates.

Suitable other diphenols HO—Z—OH (VII) are those wherein Z represents an aromatic radical having from 6 to 30 carbon atoms which may contain one or more aromatic rings, may be substituted and may contain aliphatic radicals or cycloaliphatic radicals other than those corresponding to general formula (I), or hetero atoms as bridge members.

Examples of diphenols (VII) are: hydroquinone, resorcinol, dihydroxydiphenyl, bis-(hydroxyphenhyl)alkanes, bis-(hydroxyphenyl)-cycloalkanes, bis-(hydroxyphenyl)sulphides, bis-(hydroxyphenyl)-ethers, bis-(hydroxyphenyl)-ketones, bis-(hydroxyphenyl)-sulphones, bis-(hydroxyphenyl)-sulphoxides, α,α'-bis-(hydroxyphenyl)-diisopropylbenzenes and ring-alkylated and ring-halogenated derivatives thereof.

These and further suitable other diphenols are described, for example in U.S. Pat. Nos. 3,028,365; 2,999,835; 3,148,172; 3,275,601; 2,991,273; 3,271,367; 3,062,781; 2,970,131 and 2,999,846; in German Offenlegungsschrift Nos. 1,570,703; 2,063,050; 2,063,052; 2,211,0956; French Patent No. 1,561,518; and in the monograph "H.Schnell, Chemistry and Plastics or Polycarbonates, Interscience Publishers, New York 1964".

Preferred other diphenols are, for example, 4,4'-dihydroxydiphenyl, 2,2-bis-(4-hydroxyphenyl)-propane, 2,4-bis-(4-hydroxyphenyl)-2-methylbutane, 1,1-bis-(4-hydroxyphenyl)-cyclohexane, α,α'bis-(4-hydroxyphenyl)-p-diisopropylbenzene, 2,2-bis-(3-methyl-4-hydroxyphenyl)-propane, 2,2-bis-(3-chloro-4-hydroxyphenyl)-propane, bis-(3,5-dimethyl-4-hydroxyphenyl)-methane, 2,2-bis-(3,5-dimethyl-4-hydroxyphenyl)-propane, bis-(3,5-dimethyl-4-hydroxyphenyl)-sulphone, 2,4-bis-(3,5-dimethyl-4-hydroxyphenyl)-2-methylbutane, 1,1-bis-(3,5-dimethyl-4-hydroxyphenyl)-cyclohexane, α,α'-bis-(3,5-dimethyl-4-hydroxyphenyl)-p-diisopropylbenzene, 2,2-bis-(3,5-dichloro-4-hydroxyphenyl)-propane and 2,2-bis-(3,5-dibromo-4-hydroxyphenyl)-propane.

Examples of particularly preferred diphenols (VII) are:

2,2-bis-(4-hydroxyphenyl)-propane, 2,2-bis-(3,5-dimethyl-4-hydroxyphenyl)-propane, 2,2-bis-(3,5-dichloro-4-hydroxyphenyl)-propane, 2,2-bis-(3,5-dibromo- 4-hydroxyphenyl)-propane and 1,1-bis-(4-hydroxyphenyl)cyclohexane.

2,2-(4-hydroxyphenyl)-propane is particularly preferred.

The other diphenols may be used both individually and in mixtures.

The molar ratio of diphenols (I) to the other diphenols to be optionally co-used, for example those corresponding to general formula (VII), should be from 100 mole % of (I): 0 mole % of other diphenol to 2 mole % of (I): 98 mole % of other diphenol, preferably from 100 mole % of (I): 0 mole % of other diphenol to 5 mole % of (I): 95 mole % of other diphenol, and in particular from 100 mole % of (I): 0 mole % of other diphenol to 10 mole % of (I): 90 mole % of other diphenol, and very particularly from 100 mole % of (I): 0 mole % of other diphenol to 20 mole % of (I): 80 mole % of other diphenol.

The high molecular weight polycarbonates from the diphenols (I), optionally in combination with other diphenols, may be prepared according to known polycarbonate preparation processes. The various diphenols may thus be linked with one another randomly or in blocks.

The polycarbonates may be branched in a known manner. If branching is required, it may be achieved in known manner by condensing small amounts, preferably amounts of from 0.05 to 2.0 mole % (relative to diphenols used), of at least trifunctional compounds, in particular those having three or more phenolic hydroxyl groups. Some branching agents having three or more phenolic hydroxyl groups are: phloroglucinol, 4,6-dimethyl-2,4,6-tri-(4-hydroxyphenyl)-hept-2-ene, 4,6-dimethyl-2,4,6-tri-(4-hydroxyphenyl)-heptane, 1,3,5-tri-(4-hydroxyphenyl)benzene, 1,1,1-tri-(hydroxyphenyl)-ethane, tri-(4-hydroxyphenyl)-phenylmethane, 2,2-bis-(4,4-bis-(4-hydroxyphenyl)-cyclohexyl)propane, 2,4-bis-(4-hydroxyphenylisopropyl)-phenol, 2,6-bis-(2-hydroxy-5'-methylbenzyl)-4-methylphenol, 2-(4-hydroxyphenyl)-2-(2,4-dihydroxyphenyl)-propane, hexa-(4-(4-hydroxyphenylisopropyl)-phenyl)-orthoterephthalate, tetra- (4-hydroxyphenyl)-methane, tetra-(4-(4-hydroxyphenylisopropyl)-phenoxy)-methane and 1,4-bis-(4'-,4''-dihydroxytriphenyl)-methyl)-benzene.

Some of the other trifunctional compounds are 2,4-dihydroxybenzoic acid, trimesic acid, cyanuric chloride and 3,3-bis-(3-methyl-4-hydroxyphenyl)-2-oxo-2,3-dihydroindole.

Monofunctional compounds in conventional concentrations serve as chain-terminators for controlling the molecular weight of polycarbonates (a) in a known manner. Suitable compounds are, for example phenol, t-butylphenols or other $C_1$-$C_7$ alkyl-substituted phenols. Small amounts of phenols (VIII):

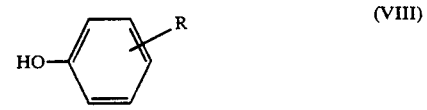

(VIII)

wherein R represents a branched $C_8$ and/or $C_9$ alkyl radical; are particularly suitable for controlling the molecular weight. The proportion of $CH_3$ protons in the alkyl radical R is preferably from 47 to 89% and the proportion of CH and $CH_2$ protons is preferably from 53 to 11%; R is also preferably in the o- and/or p-position to the OH group, and the upper limit of the ortho proportion is particularly preferably 20%. The chain-terminators are generally used in amounts of from 0.5 to 10, preferably from 1.5 to 8, mole % relative to the diphenols used.

Polycarbonates (a) may preferably be prepared by the phase boundary process (see H. Schnell, "Chemistry and Physics of Polycarbonates", Polymer Reviews, Volume IX, pages 33 ff., Interscience Publishers, 1964) in a known manner. In this process, the diphenols (I) are dissolved in aqueous alkaline phase. For the preparation of copolycarbonates with other diphenols, mixtures of diphenols (I) and the other diphenols, for example those corresponding to the general formula (VII), are used. Chain-terminators, for example corresponding to the general formula (VIII), may be added to control the molecular weight. The mixture is then reacted with phosgene in the presence of an inert, organic phase which preferably dissolves polycarbonate, according to the phase boundary polymerisation method. The reaction temperature is from 0° to 40° C.

The branching agents optionally co-used (preferably from 0.05 to 2.0 mole %) may either be placed with the diphenols in the aqueous alkaline phase, or may be added dissolved in the organic solvent before reacting with the phosgene.

In addition to the diphenols (I) and optional other diphenols (VII), monochlorocarbonates and/or bis-chlorocarbonates thereof may also be co-used, wherein these are added dissolved in organic solvents. The amount of chain-terminators and branching agents then depends on the molar amount of diphenolate radicals (I) and optionally (VII); the amount of phosgene may be reduced correspondingly in known manner when chlorocarbonates are co-used.

Suitable organic solvents for the chain-terminators and optionally for the branching agents and the chlorocarbonates are, for example methylene chloride, chlorobenzene, acetone, acetonitrile and mixtures of these solvents, in particular mixtures of methylene chloride and chlorobenzene. The chain-terminators and branching agents used may optionally be dissolved in the same solvent.

Examples of the organic phase for the phase boundary polymerisation are methylene chloride, chlorobenzene and mixtures of methylene chloride and chlorobenzene.

Aqueous NaOH solution is an example of aqueous alkaline phase.

The preparation of polycarbonates (a) in accordance with the phase boundary process, may be catalysed in conventional manner by catalysts, such as tertiary amines, in particular tertiary aliphatic amines, such as tributylamine or triethylamine; the catalysts may be used in amounts of from 0.05 to 10 mole %, relative to moles of diphenols used. The catalysts may be added before the start of phosgenation or during or even after phosgenation.

Polycarbonates (a) may also be prepared according to the known process in homogeneous phase, the so-called "pyridine process" and according to the known melt transesterification process using, for example diphenyl-carbonate instead of phosgene.

Polycarbonates (a) preferably have molecular weights $\overline{M}w$ (weight average, determined by gel chromatography after previous calibration) of at least 10,000, particularly preferably from 10,000 to 300,000, and in particular from 20,000 to 80,000, for applications in the injection moulding industry. They may be linear or branched, they are homopolycarbonates or copolycarbonates based on diphenols (I).

Polycarbonates (a) in the context of the invention are thus high molecular weight, thermoplastic, aromatic polycarbonates of $\overline{M}w$ (weight average molecular weight) of at least 10,000, preferably from 10,000 to 200,00, and in particular from 20,000 to 80,000, which contain bifunctional carbonate structural units (Ia):

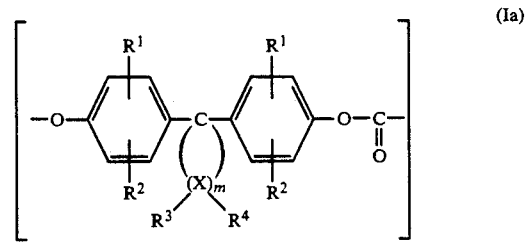

wherein
X, $R^1$, $R^2$, $R^3$, $R^4$ and m are as defined in connection with general formula (I):
in amounts of from 100 to 2 mole %, preferably from 100 to 5 mole %, and in particular from 100 to 10 mole %, and very particularly from 100 to 20 mole %, relative in each case to the total amount of 100 mole % of difunctional carbonate structural units in the polycarbonate.

The polycarbonates thus contain in each case up to 100 mole % of complementary amounts of other difunctional carbonate structural units, for example those corresponding to the general formula (VIIa):

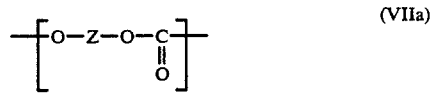

hence, in amounts of from 0 to 98 mole %, preferably from 0 to 95 mole %, and in particular from 0 to 90 mole %, and very particularly preferably from 0 to 80 mole %, relative in each case to the total amount of 100 mole % of difunctional carbonate structural units in the polycarbonate. [—Z— in general formula (VIIa) corresponds to —Z— in general formula (VII)]

By incorporating diphenols (I), novel polycarbonates having high heat resistance are formed which also have other good properties. This is true particularly for polycarbonates based on diphenols (I), wherein m represents 4 or 5, and very particularly for polycarbonates based on diphenols (Ib):

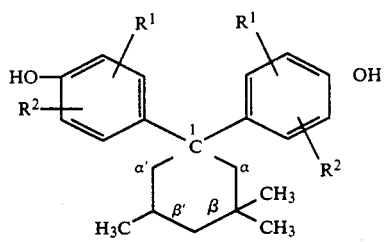

wherein

R[1] and R[2] are independently as defined in connection with general formula (I), and particularly preferably represent hydrogen.

Preferred polycarbonates (a) are those wherein m represents 4 or 5 is in the structural units (Ia), and very particularly those of units (Ic):

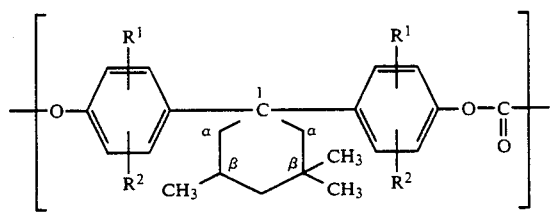

wherein

R[1] and R[2] are as defined in connection with general formula (Ia), but particularly preferably are hydrogen.

These polycarbonates based on diphenols (Ib), wherein R[1] and R[2] particularly represent hydrogen, have, in addition to high heat resistance, good stability to ultraviolet light and good flow behaviour in the melt which was not expected.

In addition, the polycarbonate properties may be varied in a favourable manner due to the choice of composition with other diphenols, in particular with those corresponding to general formula (VII).

In the following examples B.1 to B.5, the preparation of polycarbonates (a) is explained. The relative viscosity is measured on 0.5 weight % strength solutions of polycarbonates in CH$_2$Cl$_2$.

The freezing temperature or glass transition temperature is measured by Differential Scanning Calorimetry (DSC).

EXAMPLE B.1

31.0 g (0.1 mole) of diphenol (II), 33.6 g (0.6 mole) of KOH and 560 g of water are dissolved under an inert gas atmosphere with stirring. A solution of 0.188 g of phenol in 560 ml of methylene chloride is then added. 19.8 g (0.2 mole) of phosgene was introduced into the well-stirred solution at pH 13 to 14 and 21° to 25° C. 0.1 ml of ethylpyridine is then added and the solution is stirred for a further 45 minutes. The aqueous phase free of bisphenolate is separated off, after partial acidification with phosphoric acid, the organic phase is washed with water until it is neutral and solvent is removed. The polycarbonate showed a relative viscosity of 1.259.

The glass transition temperature of the polymer was determined as 233° C. (DSC).

EXAMPLE B.2

68.4 g (0.3 mole) of bisphenol A (2,2-bis-(4-hydroxyphenyl)-propane, 217.0 g (0.7 mole) of diphenol (II),336.6 g (6 moles) of KOH and 2,700 g of water are dissolved under an inert gas atmosphere with stirring. A solution of 1.88 g of phenol in 2,500 ml of methylene chloride is then added. 198 g (2 moles) of phosgene were introduced into the well-stirred solution at pH 13 to 14 and 21° to 25° C. 1 ml of ethylpiperidine is then added an the solution is stirred for a further 45 minutes. The aqueous phase free of bisphenolate is separated off, after partial acidification with phosphoric acid, the organic phase is washed with water until it is neutral and solvent is removed. The polycarbonate showed a relative viscosity of 1.336.

The glass transition temperature of the polymer was determined as 212° C. (DSC).

EXAMPLE B.3

A mixture of 114 g (0.5 mole) of bisphenol A and 155 g (0.5 mole) of diphenol (II) is reacted as in Example B.2 to give the polycarbonate.

The polycarbonate showed a relative viscosity of 1.386. The glass transition temperature of the polymer was determined as 195° C. (DSC).

EXAMPLE B.4

A mixture of 159.6 g (0.7 mole) of bisphenol A and 93 g (0.3 mole) of diphenol (II) was reacted as in example B.2 to give the polycarbonate. The polycarbonate showed a relatively viscosity of 1.437. The glass transition temperature of the polymer was determined as 180° C. (DSC).

EXAMPLE B.5

31.0 g (0.1 mole) of diphenol (II), 24.0 g (0.6 mole) of NaOH and 270 g of water are dissolved under an inert gas atmosphere with stirring. A solution of 0.309 g of 4-(1,1,3,3-tetramethylbutyl)-phenol in 250 ml of methylene chloride is then added. 19.8 g (0.2 mole) of phosgene was introduced into the well-stirred solution at pH 13 to 14 and 21° to 25° C. 0.1 ml of ethylpiperidine is then added and the solution is stirred for a further 45 minutes. The aqueous phase free of bisphenolate is separated off, after partial acidification with phosphoric acid, the organic phase is washed with water until it is neutral and solvent is removed. The polycarbonate showed a relative viscosity of 1.314. The glass transition temperature of the polymer was determined as 234° C. (DSC). To estimate the ultraviolet resistance of the polycarbonates, the primary radical formation on UV irradiation with a mercury vapour lamp (edge filter 305 nm) was determined compared to a polycarbonate based on 2,2-bis-(4-hydroxyphenyl)-propane. It showed that the polycarbonate of Example B1 has a lower primary radical formation rate and therefore a higher ultraviolet resistance. The object of the present invention of German Patent Application P 38 33 953.6 are mixtures containing:

a) from 0.1 to 99.9 wt. %, preferably from 1 to 98 wt. %, and in particular from 2.5 to 90.wt %, of high molecular weight, thermoplastic, aromatic polycarbonates of Mw (weight average molecular weights) of at least 10,000, preferably from 10,000 to 300,000, and, for applications in the field of injection moulding, in particular from 20,000 to 80,000, which contain bifunctional carbonate structural units (Ia):

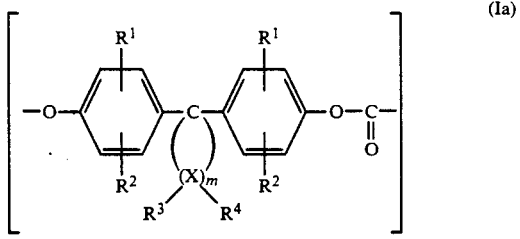

(Ia)

wherein
X, $R^1$, $R^2$, $R^3$, $R^4$ and m are as defined in connection with general formula (I):
in amounts of from 100 to 2 mole %, preferably from 100 to 5 mole %, and in particular 100 to 10 mole %, and very particularly from 100 to 20 mole %, in addition to the complementary amount of other difunctional carbonate structural units up to 100%, and b) from 99.9 to 0.1 wt.%, preferably from 99 to 2 wt. %, and in particular from 97.5 to 10 wt. %, of elastomers or of thermoplastics other than the polycarbonates of component a), wherein the sum of a)+b) is 100 wt. % in each case.

Particularly suitable polycarbonates (a) are those wherein m represents 4 or 5 in the structural units (Ia), and very particularly those having structural units (Ic):

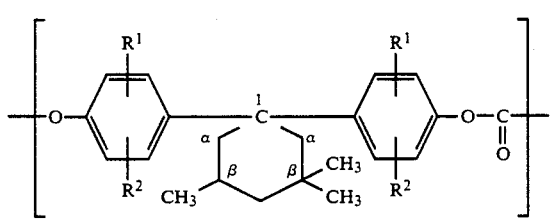

(Ic)

wherein
$R^1$ and $R^2$ are as defined in connection with general formula (Ia), but particularly preferably represent hydrogen.

Suitable other thermoplastics as component (b) in the mixtures of the invention are both b1) amorphous thermoplastics, preferably those having a glass transition temperature of more than 40° C., in particular from 60° to 220° C.; and b2) partially crystalline thermoplastics, preferably those having a melt temperature of more than 60° C., in particular from 80° to 400° C.

Elastomers for component b) of the mixtures of the invention are b3) those polymers having a glass transition temperature of below 0° C., preferably below −10° C., and in particular from −15° to −140° C.

Examples of other amorphous thermoplastics b1) are amorphous polymers selected from polycarbonates, polyamides, polyolefins, polysulphones, polyketones, thermoplastic vinyl polymers, such as polymethlacrylates or homopolymers of vinyl aromatic compounds, copolymers of vinyl aromatic compounds or graft polymers of vinyl monomers on rubbers, polyethers, polyimides and thermoplastic polyurethanes. Examples of crystalline thermoplastics b2) are aliphatic polyesters, polyarylenesulphides and the partially crystalline representatives of the thermoplastics subsumed above under b1). Examples of elastomers b3) are the widest variety of rubbers, such as ethylene-propylene rubber, polyisoprene, polychloroprene, polysiloxanes, atactic polypropylene, dienerubbers, olefin rubbers, acrylate rubbers and natural rubbers, styrene-butadiene block copolymers, ethylene copolymers with vinyl acetate or with (meth) acrylates, elastic polyurethanes as long as they are not thermoplastics subsumed under b1) or b2), and elastic polycarbonate-polyether block copolymers.

Amorphous thermoplastics b1) are particularly polycarbonates other than those from German Patent Application P 38 32 396.6 (Le A 26 344). These other polycarbonates may be both homocarbonates and copolycarbonates, they may be both linear and branched. Particularly preferred bisphenol for the other thermoplastic polycarbonates of component b) of the mixtures of the invention is bisphenol A [=2,2-bis-(4-hydroxyphenyl)-propane]. These other thermoplastic polycarbonates are known. The molecular weights $\overline{M}w$ (weight average molecular weight, determined by gel permeation chromatography in tetrahydrofuran) of the other thermoplastic polycarbonates are from 10,000 to 300,000, preferably from 12,000 to 150,000. The other thermoplastic polycarbonates may be used both alone or mixed with one another for component b) of the mixtures of the invention. Preferred other thermoplastics for component b) for the preparation of mixtures of the invention are also aliphatic, thermoplastic polyesters, particularly preferred polyalkylene terephthalates, thus, for example those based on ethylene glycol, 1,3-propanediol, 1,4-butanediol, 1,6-hexanediol and 1,4-bis-hydroxymethyl-cyclohexane. The molecular weights ($\overline{M}w$) of these polyalkylene terephthalates are from 10,000 to 80,000. The polyalkylene terephthalates may be obtained in accordance with known processes, for example from dialkyl terephthalate and the corresponding diol by transesterification (see for example U.S. Pat. Nos. 2,647,885; 2,643,989; 2,534,028; 2,578,660; 2,742,494 and 2,901,466). These polyesters are known. Furthermore, preferred other thermoplastics are thermoplastic polyamides. All partially crystalline polyamides, in particular polyamide 6, polyamide 6,6 and partially crystalline copolyamides based on both of these components are suitable. Partially crystalline polyamides are also suitable in which the acid component in particular consists wholly or partially from adipic acid or caprolactam from terephthalic acid and/or isophthalic acid and/or suberic acid and/or sebacic acid and/or azelaic acid and/or dodecanedicarboxylic acid and/or adipic acid and/or of a cyclohexanedicarboxylic acid, and in which the diamine component consists wholly or partially in particular of m-xylylenediamine and/or p-xylylenediamine and/or hexamethylenediamine and/or 2,2,4-trimethylhexamethylenediamine and/or 2,4,4-trimethylhexamethylenediamine and/or isophoronediamine, and compositions thereof are known in principle from the state of the art (see, for example, Encyclopaedia of Polymers, volume 11, page 315 ff.). In addition, partially crystalline polyamides which are prepared wholly or partially from lactams having from 6 to 12 carbon atoms, optionally co-using one or more of the abovementioned starting components, are suitable. Particularly preferred partially crystalline polyamides are polyamide 6 and polyamide 6,6 or copolyamides having a low proportion, up to approximately 10 weight percent, of other co-components. Suitable polyamides are also amorphous polyamides, obtained, for example, by polymerisation of diamines, such as hexamethylenediamines, decamethylenediamine, 2,2,4-trimethylhexamethylenediamine or 2,4,4-trimethylhexamethylenediamine, m-xylylenediamine or p-xylylenediamine, bis-(4-aminocyclohexyl)-methane, mixtures of 4,4'-diaminodicyclohexylmethanes and 2,2'-diaminodicyclohexylmethanes, 2,2-bis-(4-aminocyclohexyl)-propane, 3,3'-dimethyl-4,4'-diaminodicyclohexylmethane, 3-aminoethyl-3,5,5-trimethylcyclohexylamine, 2,5-bis-(aminomethyl)norbornane, 2,6-bis-(aminomethyl)-norbornane, 1,4-diaminomethylcyclohexane and of mixtures of these diamines, with dicarboxylic acids, such as with oxalic acid, adipic acid, azelaic acid, decanedicarboxylic acid, heptadecanedicarboxylic acid, 2,2,4-trimethyladipic acid, 2,4,4-trimethyladipic acid, isophthalic acid and terephthalic acid and with mixtures of these dicarboxylic acids. Amorphous copolyamides are thus also included which are obtained by polymerisation of several of the diamines mentioned above and/or dicarboxylic acids. Furthermore, amorphous copolyamides are included which are prepared with co-use of ω-aminocarboxylic acids, such as ω-aminocaproic acid, ω-aminoundecanoic acid or ω-aminolauric acid or lactams thereof.

Particularly suitable amorphous, thermoplastic polyamides are those which may be obtained from isophthalic acid, hexamethylenediamine and further diamines, such as 4,4'-diaminodicyclohexylmethane, isophoronediamine, 2,2,4-trimethylhexamethylenediamine or 2,2,4-trimethylhexamethylenediamine, 2,5-bis-(aminomethyl)-norbornane and/or 2,6-bis-(aminomethyl)norbornane, those which may be obtained from isophthalic acid, 4,4'-diaminodicyclohexylmethane and ω-caprolactam, those which may be obtained from isophthalic acid, 3,3-dimethyl-4,4'-diaminodicyclohexylmethane and ω-lauric lactam, and those which may be obtained from terephthalic acid and the isomer mixture of 2,2,4-trimethylhexamethylenediamine and 2,4,4-trimethylhexamethylenediamine.

Instead of pure 4,4'-diaminodicyclohexylmethane, mixtures of isomeric diaminodicyclohexylmethanes which consist of from 70 to 99 mole % of 4,4'-diamino isomer
from 1 to 30 mole % of 2,4'-diamino isomer
from 0 to 2 mole % of 2,2'-diamino isomer and optionally corresponding highly polymerized diamines obtained by hydrating diaminodiphenylmethane of technical quality, may also be used.

Suitable thermoplastic polyamides may also consist of mixtures of partially crystalline and amorphous polyamides, wherein the portion of amorphous polyamide is preferably lower than the portion of partially crystalline polyamide. The amorphous polyamides and their preparation are also known from the state of the art (see, for example Ullmann, Enzyklopädie der technischen Chemie, volume 19, page 50).

Preferred other thermoplastics b) are also thermoplastic linear or branched polyarylene sulphides. They have structural units of the general formula

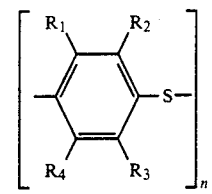

wherein $R_1$ to $R_4$ which may be the same or different, represent $C_1$–$C_6$ alkyl, phenyl or hydrogen. Furthermore, the polyarylene sulphides may also contain diphenyl units.

Polyarylene sulphides and their preparation are known (see for example U.S. Pat. No. 3,354,129 and European Application 0 171 021).

Preferred other thermoplastics b) are thermoplastic polyarylene sulphones.

Suitable polyarylene sulphones have average weight average molecular weights $\overline{M}w$ (measured by the light scattering method in $CHCl_3$) of from 1,000 to 200,000, preferably from 20,000 to 60,000. Examples of these are the polyarylene sulphones of 4,4'-dichlorodiphenylsulphone and a bisphenol which may be obtained according to known processes, in particular 2,2-bis-(4-hydroxyphenyl)-propane, having average weight average molecular weights $\overline{M}w$ of from 2,000 to 200,000.

These polyarylene sulphones are known (see for example U.S. Pat. No. 3,264,536, German Auslegeschrift No. 1,794,171, British Patent No. 1,264,900, U.S. Pat. No. 3,641,207, European Application 00 38 028, German Offenlegungsschrift Nos. 3,601,419 and 3,601,420). The suitable polyarylene sulphones may also be branched in known manner (see for example German Offenlegungsschrift No. 2,305,413).

Preferred other thermoplastics b) are also thermoplastic polyphenylene oxides, preferably poly-(2,6-dialkyl-1,4-phenylene oxides). Suitable polyphenylene oxides of the invention have weight average molecular weights $\overline{M}w$ (measured by the light scattering method in chloroform) of from 2,000 to 100,000, preferably from 20,000 to 60,000. These polyphenylene oxides are known.

The preferred poly-(2,6-dialkyl-1,4-phenylene oxides) may be obtained by known processes by oxidising polymerisation of 2,6-dialkylphenols with oxygen in the presence of catalysts combinations of copper salts and tertiary amines (see for example German Offenlegungsschrift No. 2,126,434 and U.S. Pat. No. 3,306,875).

Particularly suitable poly-(2,6-dialkyl-1,4-phenylene oxides) are the poly-[2,6-di($C_1$–$C_4$alkyl)-1,4-phenylene oxides], such as poly-(2,6-dimethyl-1,4-phenylene oxide).

Preferred other thermoplastics b) are also aromatic polyetherketones (see for example British Patent No. 1,078,234, U.S. Pat. No. 4,010,147 and European Application 0 135 938).

They contain the recurring structural element:

—O—E—O—E'—, wherein —E'— represents the divalent radical of a bisarylketone; and —O—E—O— represents a divalent diphenolate radical.

They may be prepared, for example according to British Patent No. 1 078,234 from dialkalidiphenolates:

alkali-O-E-O-alkali and bis-(halogenaryl)-ketones: Hal-E-Hal (wherein Hal represents halogen). A suitable dialkalidiphenolate is, for example that of 2,2-bis-(4-hydroxyphenyl)-propane, a suitable bis-(halogenaryl)ketone is 4,4'-dichlorobenzophenone.

Preferred other thermoplastics b) are also thermoplastic vinyl polymers.

Vinyl polymers in the context of this invention are homopolymers of vinyl compounds, copolymers of vinyl compounds and graft polymers of vinyl compounds on rubbers.

Suitable homopolymers and copolymers of the invention are those of styrene, α-methylstyrene, acrylonitrile, methacrylonitrile, $C_1$-$C_{12}$(cyclo)-alkyl esters of (meth) acrylic acid, vinyl $C_1$-$C_4$ carboxylates, wherein the copolymer mixtures may be obtained by known methods from mixtures of these vinyl compounds.

The homopolymers or copolymers should have limiting viscosities (Staudinger indices) of from 0.3 to 1.5 dl/g (measured in known manner at 23° C. in toluene).

Suitable vinyl polymers are, for example thermoplastic poly-$C_1$-$C_4$alkylmethacrylates, for example those of methylmethacrylate, ethylmethacrylate, propylmethacrylate or butylmethacrylate, preferably methylmethacrylate or ethylmethacrylate. These include both homopolymers and copolymers of these methacrylates. Furthermore, other, ethylenically unsaturated copolymerisable monomers, such as (meth)acrylonitrile, (α-methyl)-styrene, bromostyrene, vinylacetate, $C_1$-$C_8$ alkyl acrylate, (meth)acrylic acid, ethylene, propylene and N-vinylpyrrolidone may be polymerized into the structures in lower amounts.

The suitable thermoplastic poly-$C_1$-$C_4$alkylmethacrylates of the invention are known in the literature or may be obtained by processes known in the literature.

Suitable vinyl polymers are also copolymers of styrene or α-methylstyrene and acrylonitrile which optionally contain up to 40 wt.% of acrylate or methacrylate, in particular methylmethacrylate or n-butylacrylate.

Styrene derivatives must always be present as monomers. The styrene derivatives are thus present in portions of from 100 to 10 wt. %, preferably from 90 to 20 wt. %, particularly preferably from 80 to 30 wt. %, and are obtained by conventional processes, such as bulk, solution, suspension or emulsion free radical polymerisation, but preferably by free radical emulsion polymerisation in water.

Suitable graft polymers are produced by polymerising the above-mentioned vinyl monomers of vinyl monomer mixtures in the presence of rubbers having glass transition temperatures <0° C., preferably < −20° C. The graft polymers contain, as a rule, from 1 to 85 wt. %, preferably from 10 to 80 wt. %, of rubber. The graft polymers may be graft polymerized by conventional processes in solution, bulk or emulsion, preferably in emulsion, wherein vinyl monomer mixtures may be graft polymerized simultaneously or successively.

Suitable rubbers are preferably diene rubbers and acrylate rubbers.

Diene rubbers are, for example polybutadiene, polyisoprene and copolymers of butadiene with up to 35 wt. % of comonomers, such as styrene, acrylonitrile, methylmethacrylate and $C_1$-$C_6$ alkylacrylates.

Acrylate rubbers are, for example crosslinked, particle-type emulsion polymers from $C_1$-$C_6$ alkylacrylates, in particular $C_2$-$C_6$ alkylacrylates, optionally mixed with up to 15 wt. % of other, unsaturated monomers, such as styrene, methylmethacrylate, butadiene, vinylmethylether, acrylonitrile, and from at least one polyfunctional crosslinking agent, such as divinylbenzene, glycol-bis-acrylates, bisacrylamides, triallyl phosphates, triallyl citrates, allyl esters of acrylic acid and methacrylic acid, triallylisocyanurate, wherein the acrylate rubbers may contain up to 4 wt. % of crosslinking co-monomers.

Mixtures of diene rubbers and acrylate rubbers and rubbers having a core-shell structure are also suitable for preparing the graft polymers.

The rubbers must be present in the form of discrete particles for graft polymerisation, for example as latex. These particles generally have average diameters of from 10 to 2,000 nm.

The graft polymers may be produced by known processes for example by free radical emulsion graft polymerisation of vinyl monomers in the presence of rubber latices at temperatures of from 50° to 90° C. using water-soluble initiators, such as peroxodisulphate, or with the aid of redox initiators.

Emulsion graft polymers prepared by free radical reaction on particle-type highly crosslinked rubbers (diene rubbers or alkylacrylate rubbers) having gel contents >80 wt. % and average particle diameters (d50) of from 80 to 800 nm, are preferred.

Technical quality ABS polymers are particularly suitable.

Mixtures of vinyl homopolymers and/or copolymers with graft polymers are also suitable.

Preferred other thermoplastics b) are also thermoplastic polyurethanes. These are reaction products of diisocyanates, wholly or predominantly aliphatic oligoesters and/or polyesters and/or polyethers, and one or more chain-extenders. These thermoplastic polyurethanes are essentially linear and have thermoplastic processing characteristics.

The thermoplastic polyurethanes are known or may be prepared by known processes (see, for example, U.S. Pat. No. 3,214,411, J. H. Saunders and K. C. Frisch, "Polyurethanes, Chemistry and Technology", Volume II, pages 299 to 451, Interscience Publishers, New York, 1964 and Mobay Chemical Corporation, "A Processing Handbook for Texin Urethane Elastoplastic Materials", Pittsburgh, Pa.).

Starting materials for preparing oligoesters and polyesters are, for example adipic acid, succinic acid, subecic acid, sebacic acid, oxalic acid, methyladipic acid, glutaric acid, pimelic acid, azelaic acid, phthalic acid, terephthalic acid and isophthalic acid.

Adipic acid is preferred here.

Suitable glycols for preparing oligoesters and polyesters are, for example ethylene glycol, 1,2-propylene glycol, 1,3-propylene glycol, 1,2-butanediol, 1,3-butanediol, 1,4-butanediol, 2,3-butanediol, 2,4-butanediol, hexanediol, bishydroxymethylcyclohexane, diethylene glycol and 2,2-dimethylpropylene glycol. Furthermore, small amounts, up to 1 mole %, of tri- or higher functional alcohols, for example trimethylolpropane, glycerol, hexanetriol and the like, may be used together with the glycols.

The resulting hydroxyl oligoesters or hydroxyl polyesters have a molecular weight of at least 600, a hydroxyl number of from about 25 to 190, preferably from about 40 to 150, an acid number of from about 0 5 to 2 and a water content of from about 0.01 to 0 2%.

Oligoesters or polyesters are also oligomer or polymer lactones, such as oligo-caprolactone or polycaprolactone, and aliphatic polycarbonates, such as poly-1,4-butanediolcarbonate or poly-1,6-hexanediolcarbonate.

A particularly suitable oligo radical which may by used as starting material for the thermoplastic polyurethanes, is prepared from adipic acid and a glycol which has at least one primary hydroxyl group. Polymerisation is complete when an acid number of 10, preferably from about 0.5 to 2, is reached. The water produced during the reaction is thus separated off simultaneously or afterwards, so that the water content at the end is from about 0.01 to 0.05%, preferably from 0.01 to 0.02.

Oligoethers or polyethers for manufacturing polyurethanes are, for example those based on tetramethylene glycol, propylene glycol and ethylene glycol.

Polyacetals are also included as polyethers and may be used.

The oligoethers or polyethers should have average molecular weights Mn (number average, determined via OH number of the products) of from 600 to 2,000, preferably from 1,000 to 2,000.

4,4'-diphenylmethane-diisocyanate is preferably used as organic diisocyanate to prepare the polyurethanes. They should contain less than 5% 2,4'-diphenylmethanediisocyanate and less than 2% of the dimer of diphenylmethane-diisocyanate. Furthermore, it is desirable that the acidity, calculated as HCl, is from about 0.005 to 0.2%. The acidity, calculated as %HCl, is determined by extracting chloride from the isocyanate in hot aqueous methanol solution or by releasing chloride by hydrolysis with water, and titrating the extract with standard silver nitrate solution, to obtain the chloride ion concentration present therein.

Other diisocyanates may also be used to prepare thermoplastic polyurethanes, for example the diisocyanates of ethylene, ethylidene, propylene, butylene, 1,3-cyclopentylene, 1,4-cyclohexane, 1,2-cyclohexylene, 2,4-tolylene, 2,6-tolylene, p-phenylene, m-phenylene, xylene, 1,4-naphthylene, 1,5-naphthylene, 4,4'-diphenylene, and the 2,2-diphenylpropane-4,4'diisocyanate, azobenzene-4,4'-diisocyanate, diphenylsulphone-4,4'-diisocyanate, dichlorohexanemethylene-diisocyanate, pentamethylenediisocyanate, hexamethylene-diisocyanate, 1-chlorobenzene-2,4-diisocyanate, furfuryldiisocyanate, dicyclohexylmethane-diisocyanate, isophoronediisocyanate, diphenylethane and bis-(isocyanatophenyl)ether of ethylene glycol, butanediol and the like.

Organic difunctional compounds which may be used as chain-extenders are those which contain active hydrogen, reactive with isocyanates, for example diols, hydroxycarboxylic acids, dicarboxylic acids, diamines and alkanolamines and water. Examples of these which should be mentioned are ethylene glycol, propylene glycol, butylene glycol, 1,4-butanediol, butanediol, butindiol, xylene glycol, amylene glycol, 1,4-phenylene-bis-βhydroxyethylether, 1,3-phenylenebis-β-hydroxyethylether, bis-(hydroxymethylcyclohexane), hexanediol, adipic acid, ω-hydroxycaproic acid, thiodiglycol, ethylenediamine, propylenediamine, butylenediamine, hexamethylenediamine, cyclohexylenediamine, phenylenediamine, tolylenediamine, xylyleneidamine, diaminodicyclohexylmethane, isophoronediamine, 3,3'-dichlorobenxidine, 3,3'-dinitrogenzidine, ethanolamine, aminopropyl alcohol, 2,2-dimethylpropanolamine, 2-aminocyclohexyl alcohol and p-aminobenzyl alcohol. The molar ratio of oligoester or polyester to bifunctional chain-extenders is from 1:1 to 1:50, preferably from 1:2 to 1:30.

In addition to difunctional chain-extenders, tri- or higher functional chain-extenders may also be used in lower amounts up to about 5 mole %, relative to moles of bifunctional chain-extenders used.

Tri- or higher functional chain-extenders of this type are, for example glycerol, trimethylolpropane, hexanetriol, pentaerythritol and triethanolamine.

Monofunctional components, for example butanol, may also be used to prepare thermoplastic polyurethanes.

The diisocyanates, oligoesters, polyesters, polyethers, chain-extenders and monofunctional components mentioned for the thermoplastic polyurethanes are either known in the literature or may be obtained by processes known in the literature.

The known preparation of polyurethanes may be carried out, for example, as follows:

Hence, for example the oligoester or polyester, the organic diisocyanates and the chain-extenders may be heated, preferably at a temperature of from about 50 to 220° C., and then mixed. The oligoesters or polyesters are preferably heated initially individually, then mixed with the chain-extenders and the resulting mixture is mixed with the preheated isocyanate.

Mixing the starting components to prepare polyurethanes may be carried out using a mechanical stirrer which permits intensive mixing within a short time. If the viscosity of the mixture should rise too quickly prematurely during stirring, either the temperature may be lowered or a small amount (from 0.001 to 0.05 wt. %, relative to ester) of citric acid or similar may be added to reduce the rate of reaction. To increase the reaction rate, suitable catalysts, such as tertiary amines which are mentioned in U.S. Pat. No. 2,729,618, may be used.

Preferred elastomers b3) for component b) to prepare mixtures of the invention are the above-mentioned polyurethanes, as long as they are elastic in nature, styrene, butadiene block copolymers which may be partially hydrated (for example Kraton G ® by Shell), the rubbers mentioned above for the graft polymers, the graft polymers themselves as long as they are elastic, and elastic polycarbonate-polyether block copolymers.

The elastomers are known.

The mixtures of polycarbonates a) and elastomers b) of the invention may be prepared, for example by mixing components a) and b3) in the melt on conventional apparatus, such as kneaders, single or multiwave extruders or rollers. An object of German Patent Application P 38 33 953.6 is also a process for preparing mixtures of from 0.1 to 99.9 wt. %, preferably from 1 to 98 wt. %, and in particular from 2.5 to 90 wt. %, of polycarbonate a) with from 99.9 to 0.1 wt. %, preferably from 99 to 2 wt. %, and in particular from 97.5 to 10 wt. %, of elastomer b3) which is characterised in that polycarbonate a) is melted and elastomer b3) is added and is homogenised in the melt of the polycarbonate.

The mixtures of polycarbonates a) and the other thermoplastics b1) or b2) of the invention may be prepared, for example by mixing solutions of components a) and b) or by mixing components on kneaders, rollers or single or multiwave extruders.

An object of German Patent Application P 38 33 953.6 is also a process for preparing mixtures of from 0.1 to 99.9 wt. %, preferably from 1 to 98 wt. %, and in particular from 2.5 to 90 wt. %, of polycarbonate a) with from 99.9 to 0.1 wt. %, preferably from 99 to 2 wt.

%, and in particular from 97.5 to 10 wt. %, of other thermoplastics b1) or b2), which is characterised in that all components are mixed as solutions and this mixture is worked-up in conventional manner, or in that all components are mixed in the melt and are homogenised.

The additives usual for component b) may also be added in the conventional amounts to the mixtures of the invention as component c), for example fillers and/or nucleating agents and/or fibers.

Inorganic fillers are, for example ceramic fillers, such as aluminium nitrate, silicates, titanium dioxide, talcum, chalk, mica, soot, fiber, graphite, and for example those of glass, of carbon or of liquid crystalline polymers.

Nucleating agents may be, for example barium sulphate or $TiO_2$.

These additives may be mixed with component b) in the conventional amounts either before preparation of mixtures of the invention, or to component b) together with polycarbonates of component a), or may be subsequently worked into the mixtures of the invention of components a) and b).

Likewise, the additives mentioned may be added in the conventional amounts to the polycarbonates of component a), before or during or after mixing with component b).

The mixtures of the invention may be processed to various moulded bodies on usual machines in conventional manner.

The mixtures of the invention and the moulded bodies produced therefrom may be used in the automobile industry and the electrical industry, for example to manufacture bumpers and housings.

EXAMPLES

C) components
 C1) corresponds to Example B1)
 C2) polystyrene, prepared by free radical polymerisation of styrene in known manner. Mw (measured by light scattering) 260,000.
 C3) bisphenol A polycarbonate having a relative viscosity $\eta_{rel}$ (measured in $CH_2Cl_2$ at 25° C. and C=0.5 g/dl) of 1.28
 C4) polymethylmethacrylate
 C5) polycaprolactam having a relative viscosity of 3.0 (measured as a 0.5 wt. % solution in m-cresol)
 C6) polyethylene terephthalate D) mixtures
 D1) 37 g of the substance C1) and 37 g of substance C2) were each dissolved in 200 ml of methylene chloride. The solutions were then combined, the solvent was partly removed under vacuum until the solution was thickened, from this sheets having a thickness of 200 μm were prepared on a film drawing bench. 6 pieces of this sheet were superposed and pressed for 5 minutes in air at a pressure of 200 bar at 270° C. to give a rectangular moulding having a thickness of 1.042 mm.
 D2) 30 g of the substance C1 and 30 g of the substance C3 were each dissolved in 200 ml of methylene chloride. The solutions were then combined, the solution was thickened as in Example D1), and a sheet of 210 μm thickness was prepared. 6 pieces of the sheet were superposed as in Example D1) and pressed for 5 minutes in air at a pressure of 210 bar at 250° C. to give a rectangular moulding having a thickness of 0.989 mm.
 D3) 25 g of substance C1) and 25 g of substance C4) were each dissolved in 200 ml of methylene chloride. The solutions were then combined, the solvent was partly removed in vacuum until the solution is thickened and from this sheets having a thickness of 200 μm were prepared on a film drawing bench. 6 pieces of this sheet were superposed and pressed for 5 minutes in air at a pressure of 200 bar at 270° C. to give a rectangular moulding having a thickness of 0.61 mm.
 D4) 70 g of substance C5) are melted in a flask with 30 g of the substance C1) and homogenised. After cooling the melt, the mixture is comminuted and the granules are pressed to give a moulding of thickness 1.6 mm as described in Example D3).
 D5) 35 g of substance C6) and 15 g of C1) was pressed to give a moulding of thickness 1.6 mm described in Example D4.

E) testing the samples prepared according to D.

The shear modulus of both samples was measured using a torsion spindle from Messrs. Brabender, Type 802301 above room temperature. The sample was introduced at the temperature mentioned below at a heating rate of 1 K/minute, the samples are subjected to a tensile strength of 10p during the whole of the measuring time. The torque was 1,570 $gcm^2$. Deformation of the sample is detected clearly at modulus values below 10 Mpa, because the sample no longer has sufficient inner strength.

| | Results: | | |
|---|---|---|---|
| | Shear modulus in MPa at | | |
| No. of example | T = 50° C. | T = 160° C. | T = 200° C. |
| Substance C2) | 1,000 | <10 | <10 |
| Substance C3) | 950 | <10 | <10 |
| Substance C4) | 980 | <10 | <10 |
| Substance C5) | 400 | 120 | 70 |
| Substance C6) | 800 | 50 | 40 |
| D1) | 1,000 | 80 | 65 |
| D2) | 950 | 230 | 57 |
| D3) | 1,050 | 20 | — |
| D4) | 1,000 | 200 | 40 |
| D5) | 950 | 180 | 80 |

Sheets from mixtures of particular novel polycarbonates a) with other thermoplastic polycarbonates b1) are described in German Patent Application P 38 40 166.5 (Le A 26543), wherein the weight ratios of a) to b1) are from 0.1:99.9 wt. % to 99.9:0.1 wt. %, preferably from 5:95 wt. % to 95:5 wt. %, and in particular from 10:90 wt. % to 90:10 wt. %.

It has now been shown that the polycarbonates of component a) of German Patent Application P 38 33 953.6 (Le A 26 397), which contain only those difunctional carbonate structural units (Ia) and optionally (VIIa), mixed with the suitable other thermoplastic polycarbonates according to component b1) which contain only those difunctional carbonate structural units (VIIa), in the mixing range specified in P 38 33 953.6 from 0.1 to 99.9 wt. % to from 99.9 to 0.1 wt % to 0.1 wt. %, may form transparent mixtures which are particularly suitable for optical applications, especially for preparing optical data storage media, such as compact discs.

That is to say, it has been shown that transparency occurs at molar ratios of the difunctional structural units (Ia):(VIIa) of 0.1 mole % (Ia) to 55 mole % (Ia) and of 65 mole % (Ia) to 99.9 mole % (Ia), relative in each case to the total molar amount of 100 mole % of difunctional structural units (Ia)+(VIIa), this being independent of the distribution of the structural units (Ia) and (VIIa) on polycarbonate components a) and b1). The manufacture of compact discs from mixtures of thermoplastics is known. (See, for example, German Offenlegungsschrift No. 3,704,688).

An object of the present invention is thus the use of the mixtures according to German Patent Application P 38 33 953.6 containing from 0.1 to 99.9 wt. % of polycarbonates of component a) of German Patent Application P 38 33 953.6 which only contain those difunctional carbonate structural units (Ia) and optionally (VIIa), and from 99.9 to 0.1 wt. % of other thermoplastic polycarbonates according to component b1) of German Patent Application P 38 33 953.6 which only contain those difunctional carbonate structural units (VIIa), wherein the sum of the wt. % of a) and b1) is 100 wt. % in each case, in optical applications, in particular for manufacturing optical data storage media, very particularly for manufacturing compact discs, wherein the molar ratio of structural units (Ia) to structural units (VIIa) is from 0.1 mole % (Ia) to 55 mole % (Ia) and from 65 mole % (Ia) to 99.9 mole % (Ia), preferably from 0.5 mole % (Ia) to 50 mole % (Ia) and from 70 mole % (Ia) to 99.9 mole % (Ia), and in particular from 1 mole % (Ia) to 45 mole % (Ia), and from 80 mole % (Ia) to 99.9 mole % (Ia), relative in each case to the total molar amount of 100 mole % of structural units (Ia)+(VIIa) in the mixtures consisting of polycarbonate components a) and b1).

The molar amount of structural units (VIIa) is thus in each case the amount complementary to (Ia), relative in each case to 100 mole % of (Ia)+(VIIa).

In addition, an object of the invention is articles for optical applications, in particular data storage media, and very particularly compact discs, which are manufactured wholly or partially from the above-defined polycarbonate mixtures which may be used in accordance with the invention.

The polycarbonates of component a) are those from diphenols (I) German Patent Application P 38 33 953.6, optionally mixed with diphenols (VII) of German Patent Application P 38 33 953.6

The other thermoplastic polycarbonates of component b1) of German Patent Application P 38 33 953.6 are, as already mentioned, those based on diphenols (VII) of German Patent Application P 38 33 953.6, preferably (VIIb):

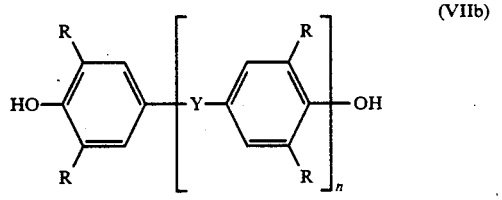

(VIIb)

wherein n represents 0 or 1,

Y represents a single bond, $C_1$-$C_{10}$ alkylene, $C_2$-$C_{10}$ alkylidene, $C_5$-$C_{12}$ cycloalkylene, $C_5$-$C_{12}$ cycloalkylidene, —O—, —S—, —SO—, —SO$_2$— or —CO—; and R independently represents H, $CH_3$, Cl or bromine.

Suitable diphenols (VIIb) are those already mentioned in connection with general formula (VII) of German Patent Application P 38 33 953.6.

Preferred diphenols (VIIb) are in particular bisphenol-Z, bisphenol-A and tetramethylbisphenol-A.

Preferred diphenols for preparing polycarbonate component a) are the diphenols (II) and (III) of German Patent Application P 38 33 953.6.

Preferred polycarbonate mixtures a)+b) are mixtures of polycarbonates based on the particular preferred diphenols mentioned above.

The polycarbonates which may be used in accordance with the invention of component a)+b) independently of one another may be linear or branched.

In principle, the molecular weights of the individual components may vary within a wide range. Molecular weights Mw (weight average, determined with the aid of gel permeation chromatography) of the polycarbonates used in preferably from 10.000 to 190,000 g/mole for component a), and from 12,000 to 130,000 g/mole for component b).

The molecular non-uniformity $Un = Mw/Mn - 1$ ($Mn$ = number average molecular weight, determined with the aid of gel permeation chromatography) may, in principle, also be varied within a wide range. Those mixtures are preferred for which Un is smaller than 2, preferably smaller than 1.3, in particular smaller than 0.9 at least for one of the components a) or b). Components a) and b) have proved to be particularly advantageous if the molecular non-uniformity $Un = Mw/Mn - 1$ is smaller than 2 for both components.

The proportions of diphenols (I), in particular (II) and/or, (III), to prepare polycarbonate component a) in general vary from 0.1 to 100 mole %, relative to the particular total amount of diphenol used to prepare polycarbonate component a), and depend on the proviso according to the invention concerning the structural units (Ia) and (VIIa).

On the basis of this proviso according to the invention, the expert is trusted as to how he adjusts the weight ratios, depending on the molar ratio of bisphenols used within the individual polycarbonates a) or b). It may, for example be advantageous to use a particularly high molar portion of bisphenols (I) to prepare polycarbonate a). In this case, it is particularly favourable to use either not more than 40 wt. % of this polycarbonate a), or to use more that 80 wt. % of this polycarbonate.

If only bisphenol-Z, bisphenol-a and tetramethylbisphenol-A are combined with diphenols (I), in particular with diphenol (II), to prepare polycarbonate components a) and b), it may be advantageous if only very few mole % of diphenols (I) are used for the preparation of polycarbonate a), however, component a) is then used in a higher concentration in terms of weight. In general, in accordance with the proviso defined above, for example a polycarbonate a) having a molar portion of diphenols (I), in particular (II), of about 10 to 55 mole % may be mixed with at least 10 wt. %, preferably with more than 30 wt. %, of polycarbonate b), as long as in particular the proviso according to the invention is guaranteed.

In addition to transparency, the above polycarbonate mixtures suitable for optical applications have, in particular, a high thermal dimensional stability. In the present context, a polymer mixture is transparent if a sample thickness of at least 200 μm has a Haze index (determined according to ASTM D 1003) of less than 10 %.

The preparation of polycarbonate mixtures of the invention suitable for optical applications may be carried out in conventional mixing apparatus at temperatures of from 250° to 400° C., or may be carried using the solutions of polycarbonate components a) and b) in suitable solvents, such as $CH_2Cl_2$, and then removing solvent by evaporation.

The further processing of polycarbonate mixtures via the intermediate granule stage or directly from the mixing process to mouldings for optical applications is carried out in known manner.

Suitable mouldings for optical applications are, for example discs, plates, wires, fibers and other three-dimensional components.

In the context of the invention, use in optics or optical applications is to be understood as meaning use in the automobile industry, as combined vision and protective screens, as cover plates for electrical display apparatus, as signal lights, as signs and sign transfers, as lenses for photographic and film cameras, as light conductors in the form of fibers and cables, and of course data storage media, in particular as compact discs.

It may be advantageous to add additives conventional for optical application, such as, inter alia, dyestuffs, UV absorbers, heat stabilisers, and $H_2O$, in the conventional amounts to the mixtures to be used according to the invention.

An object of the present invention is thus also the use in optics of polycarbonate mixtures of the invention including the additives conventional for optical applications.

An objection of the present invention is also polycarbonate mixtures consisting of polycarbonates of component a) of German Patent Application P 38 33 953.6 which only contain those difunctional carbonate structural units (Ia) and optionally (VIIIa), and the other thermoplastic polycarbonates of German Patent Application P 38 33 953.6 which only contain those difunctional carbonate structural units (VIIa) as component b1), wherein component a) is present in amounts of from 10.1 to 89.9 wt. %, and the other polycarbonates of component b1) are present in amounts of from 89.9 to 10.1 wt. %, wherein the sum of a)+b1) is 100 wt. % in each case, wherein the molar ratio of structural units (Ia) to (VIIa) is from 0.1 mole % (Ia) to 55 mole % (Ia) and from 65 mole % (Ia) to 99.9 mole % (Ia), preferably from 0.5 mole % (Ia) to 50 mole % (Ia) and from 70 mole % (Ia) to 99.9 mole % (Ia), and in particular from 1 mole % (Ia) to 45 mole % (Ia) and from 80 mole % (Ia) to 99.9 mole % (Ia), relative in each case to the total molar amount of 100 mole % of structural units (Ia)+(VIIa) in the mixtures consisting of polycarbonate components a) and b), and wherein the weight ratio of 50 wt. % (Ia) to 50 wt. % (VIIa) is excluded.

Further more, in these polycarbonate mixtures of the invention poly(meth)acrylates having grafted polycarbonate chains according to German Patent Application P 39 11 222.5 (Le A 26 692) are excluded as polycarbonate components.

EXAMPLES D

A) The diphenol (II) of Example A of German Patent Application P 38 33 953.6 (page 12 of the present patent application) was used as the diphenol.

B) Preparation of copolycarbonate B.6

148.2 g (0.65 mole) of 2,2-bis-(4-hydroxyphenyl)propane, 108.5 g (0.35 mole) of the diphenol of Example a of German Patent Application P 38 33 953.6, 336.6 g (6 moles) of KOH and 2,700 g of water are dissolved under an inert gas atmosphere with stirring. A solution of 8.86 g of isooctylphenol in 2,500 ml of methylene chloride is then added. 198 g (2 moles) of phosgene are introduced into the well-stirred solution at pH 13-14 and 21°-25° C. 1 ml of ethylpiperidine is then added and the mixture is stirred for a further 45 minutes. The aqueous phase free of bisphenolate is separated off, after partial acidification with phosphoric acid, the organic phase is washed with water until it is neutral, and solvent is removed. The polycarbonate showed a relative viscosity of 1.20. ($\eta$rel was measured on 0.5 wt. % solution of polycarbonate in $CH_2Cl_2$) and a $T_g$ 185° C. [The freezing or glass transition temperature was measured using Differential Scanning Calorimetry (DSC)].

PREPARATION OF POLYCARBONATE B7

The preparation of B7 corresponds to that of B.1, wherein isooctylphenol was used as chain-terminator in amounts of 1.6 mole %. The granules obtained had a $\eta_{rel}$ 1.30 and a $T_g$ 237° C., both values determined as described above for B6.

PREPARATION OF POLYCARBONATE B8

The preparation of B8, wherein 102.6 g (45 mole %) of 2,2-bis-(4-hydroxyphenyl)-propane and 170.5 g (55 mole %) of the diphenol of Example A of German Patent Application P 38 33 953.6 and 4.74 g of isooctylphenol as chain-terminator, and 2 moles of phosgene were used, carried out us described above for B6.

The granules obtained had a $\eta_{rel}$ of 1.29 and a $T_g$ of 204° C., both values determined as described above for B6.

PREPARATION OF POLYCARBONATE B9

The preparation of B9, wherein 182.4 g (80 mole %) of 2,2-bis-(4-hydroxyphenol)-propane, and 62 g (20 mole %) of the diphenol of Example A of German Patent Application P 38 33 953.6 and 6.18 g (0.03 mole) of isooctylphenol as chain-terminator, and phosgene were used, also carried out as described above for B6.

The granules obtained has a $\eta_{rel}$ of 1.30 and a $T_g$ of 173° C., both values determined as described for B6.

C. components

C1) = B6

C2) is a homopolycarbonate of 2,2-bis-(4-hydroxyphenyl)-propane having a $\eta_{rel}$ 1.20, and a $T_g$ of 135° C., wherein both values in turn as was described for B6.

C3) = B7

C4) = B8

C5) = B9

C6) is in turn a homopolycarbonate of 2,2-bis-(4-hydroxyphenyl)-propane having a $\eta_{rel}$ of 1.28 and a $T_g$ of 148° C., measured as described for B6, and having a non-uniformity $$U = \frac{Mw}{Mn} - 1 \text{ of } 1.01,$$

wherein
Mn = 28,200, and
Mn = 14,010.

C7) corresponds to C6), but having a non-uniformity $(_{Mn}M^w)$ of 0.8, a $\eta_{rel}$ of 1.22 and $T_g$ of 143° C. measured in turn as explained for C6.

C8) is a homopolycarbonate of 2,2-bis-(4-hydroxy-3,5-dimethylphenyl)-propane having $\eta_{rel}$ of 1.29, a $T_g$ of 197° C., measured in turn as explained for C6.

D MIXTURES

D1) 50 parts C1 and 50 parts C2 were homogenised in the melt on a two-wave extruder at 320° C. A compact disc having a diameter of 12 cm diameter was injection moulded (solids temperature 350° -360° C.) on a Netstal injection moulding machine from the sample obtained. The double refraction was determined in the axial direction on the compact disc obtained. The double refraction was assessed using path difference measurements using a conventional comparator by means of a polarisation microscope. The assessment of the compact disc as regards transparency was carried out manually. The glass transition temperature $T_g$ of the sample investigated was determined by DSC as already mentioned: path difference (nm/mm)+6; $T_g$ 164° C., transparency present.

D2) 90 wt. % C4 and 10 wt. % C7
D3) 75 wt. % C4 and 25 wt. % C6
D4) 80 wt. % C3 and 20 wt. % C6
D5) 70 wt. % C4 and 30 wt. % C6
D6) 80 wt. % C5 and 20 wt. % C6
D7) 70 wt. % C3 and 30 wt. % C6
D8) 50 wt. % C3 and 50 wt. % C8
D9) 80 wt. % C3 and 20 wt. % C8

The mixtures D2) to D9) were mixed and granulated at temperatures of from 300° to 330° C. on a two-wave extruder ZSK 32 from Messrs. Werner and Pfleiderer in a known manner.

The Haze index was then determined in accordance with ASTM D 1003 on samples 0.2 nm thick, and transparency was assessed in all cases.

What is claimed is:

1. An article for an optical application comprising
   a) about 0.1 to 99.9 wt. % of a thermoplastic aromatic polycarbonate resin having a weight average molecular weight of at least 10,000 containing difunctional carbonate structural units corresponding to (Ia):

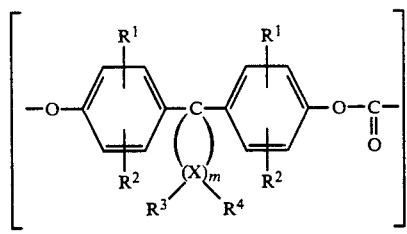

wherein
$R^1$ and $R^2$ independently represent hydrogen, halogen, $C_1-C_8$ alkyl, $C_5-C_6$ cycloalkyl, $C_6-C_{10}$ aryl or $C_7-C_{12}$ aralkyl;
m represents 4 or 5;
$R^3$ and $R^4$, which are selected individually for each X, independently represent hydrogen or $C_1-C_6$ alkyl; and
X represents a carbon atom;
provided that $R^3$ and $R^4$ both represent alkyl on at least one X atom; in amounts of from 100 to 2 mole %, relative to the total molar amount of the difunctional carbonate structural units, and a complementary amount to 100 mole % of other difunctional carbonate structural units (VIIa):

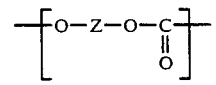

wherein
—Z— represents an aromatic radical having from 6 to 30 carbons atoms; and
   b) from 99.9 to 0.1 wt. % of at least one thermoplastic polycarbonate other than component (a) which is characterized in that said other polycarbonate contains only difunctional carbonate structural units corresponding to (VIIa), and optionally,
   c) conventional additives for optical applications,
wherein the sum of the wt. % of a) and b) is 100 mole %, and wherein the molar ratio of structural units (Ia) to structural units (VIIa) is from 0.1 mole % (Ia) to 55 mole % (Ia) and from 65 mole % (Ia) to 99.9 mole % (Ia), relative to the total molar amount of 100 mole % of structural units (Ia)+(VIIa) in the mixtures consisting of polycarbonate components a)+b).

2. The article of claim 1 wherein said molar ratio of structural units (Ia) to structural units (VIIa) is from 0.5 mole to 50 mole (Ia) and from 70 mole % (Ia) to 99.9 mole (Ia), relative in each case to the total molar amount of 100 mole % of structural units (Ia)+(VIIa).

3. The article of claim 1, characterized in that the molar ratio of (Ia) to (VIIa) is from 1 mole % (Ia) to 45 mole % (Ia) and from 80 mole % (Ia) to 99.9 mole % (Ia), relative in each case to the total molar amount of 100 mole % of the structural units (Ia)+(VIIa).

4. The article of claim 1 which is an optical data storage medium.

5. The article of claim 4 wherein the optical data storage medium is a compact disc.

6. A method for preparing an article for an optical application comprising molding a molding composition which comprises
   a) about 0.1 to 99.9 wt. % of a thermoplastic, aromatic polycarbonate resin having a weight average molecular weight of at least 10,000 containing difunctional carbonate structural units corresponding to (Ia):

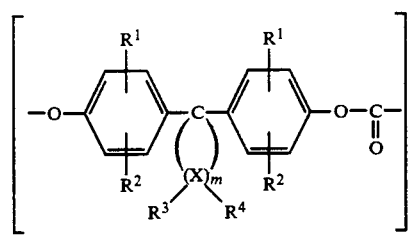

wherein
$R^1$ and $R^2$ independently represent hydrogen, halogen, $C_1-C_8$ alkyl, $C_5-C_6$ cycloalkyl, $C_6-C_{10}$ aryl or $C_7-C_{12}$ aralkyl;
m represents 4 or 5;
$R^3$ and $R^4$, which are selected individually for each X, independently represent hydrogen or $C_1-C_6$ alkyl; and
X represents a carbon atom;
provided that $R^3$ and $r^4$ both represent alkyl on at least one X atom; in amounts of from 100 to 2 mole %, relative to the total molar amount of the difunctional carbonate structural units, and a complementary amount to 100 mole % of other difunctional carbonate structural units (VIIa):

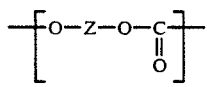 (VIIa)

wherein
—Z—represents an aromatic radical having from 6 to 30 carbon atoms; and b) from 99.9 to 0.1 wt. % of at least one thermoplastic polycarbonate other than component (a) which is characterized in that said other polycarbonate contains only difunctional carbonate structural units corresponding to (VIIa), and optionally, c) conventional additives for optical applications, wherein the sum of the wt. % of a) and b) is 100 mole %, and wherein the molar ratio of structural units (Ia) to structural units (VIIa) is from 0.1 mole % (Ia) to 55 mole % (Ia) and from 65 mole % (Ia) to 99.9 mole % (Ia), relative to the total molar amount of 100 mole % of structural units (Ia)+(VIIa) in the mixtures consisting of polycarbonate components a)+b).

7. An article prepared by the method of claim 6.

8. An optical data storage medium prepared by the method of claim 6.

9. A compact disc made by the method of claim 6.

* * * * *